*J. H. More,*
*Hanging Saws,*
*N⁰ 15,890.                    Patented Oct. 14, 1856.*
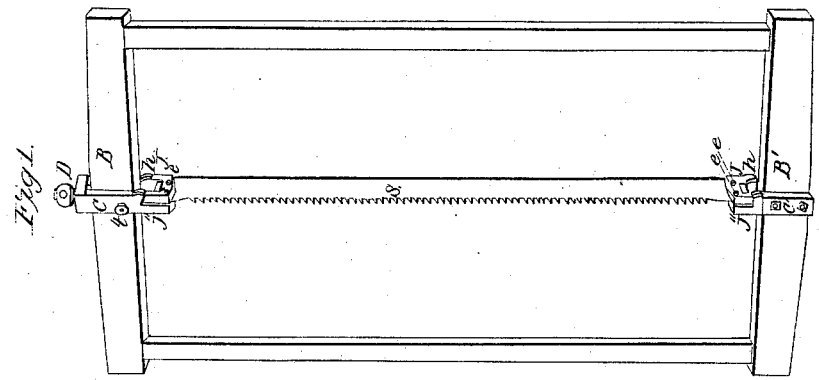
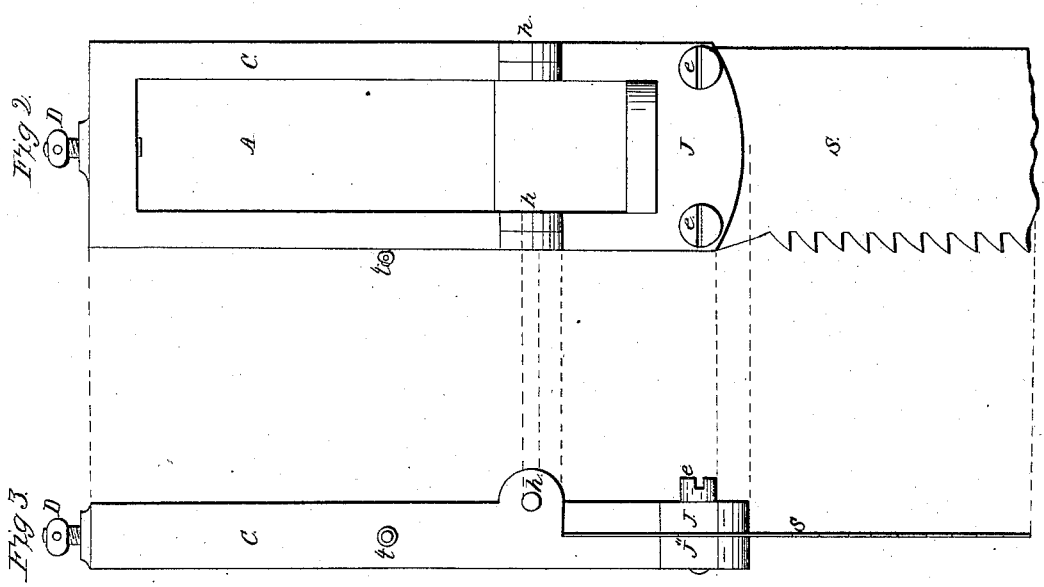
Witnesses:
Inventor:

UNITED STATES PATENT OFFICE.

JOHN H. MORE, OF WEST TROY, NEW YORK.

METHOD OF HANGING RECIPROCATING SAWS.

Specification of Letters Patent No. 15,890, dated October 14, 1856.

*To all whom it may concern:*

Be it known that I, JOHN H. MORE, of West Troy, in the county of Albany and State of New York, have invented a new and useful Improvement in the Manner of Attaching Sawmill-Saws to Their Saw-Gates or Chassis, which I name an Improved Mill-Saw Clamp; and I do hereby declare that the following is a full and exact description thereof, reference being had to the accompanying drawings, and to the letters of reference marked thereon, the same or like letters always indicating the same parts, in which—

Figure 1 is a perspective view of a saw-gate with the saw in place—B, B', upper and lower transoms; C, C', upper and lower clamps; J, J', the winged jaw of each clamp; D, straining screw to the upper clamp; e, e, e, e, clamp screws which grip the movable jaw S; h, the hinges; C, C', the body of the stirrups; j, j, the fixed jaws.

Fig. 2 is a side view of the upper clamp, on a larger scale—C, the body; A, the eye, through which the upper transom passes; J, hinged jaw; e, e, clamp screws to confine the saw; h, hinges; D, straining screw; t, set screw; S, the saw.

Fig. 3 is a front, or edge view of the upper clamp; same scale as No. 2, with the same letters of reference; showing the hinge joint and attachment of saw (S) more distinctly.

The object of my invention is to enable the workman to hang, straighten and adjust his saw with a greater facility and accuracy than by any other known method—to retain it perfect in position—and to be able to detach and re-adjust it with expedition. To effect these objects the faces of the upper and lower clamps on the fixed body C, &c., are planed or finished perfectly flat; against these faces the saw is pressed by the hinged jaws J, J. These finished faces of the upper and lower clamps are both adjusted and fixed in the same perpendicular plane—consequently when the ends of the saw are pressed against them by the hinged jaws it must be rendered flat; or, out of twist. The screws e, e, e, e, pass through the ends of the saw, and receive the stress of straining it. By opening the hinged jaws, J, J, the saw may be detached and re-adjusted, with great expedition and perfect accuracy, thus greatly economizing time over all other known methods.

The stirrups, or clamps, C, C', may be made of forged or of "malleable" iron, brass, or any material proper for the purpose. The straining screw D, is best of steel; the other screws may be of forged iron. Both clamps may be made like the upper one; or the lower one may be staple form, as in the drawings.

I am aware that a great variety of stirrups for attaching reciprocating saws to their saw gates, or chassis, have been invented; but none, as I believe, which combine all the advantages of my invention—or, which are constructed on the same principles.

What I claim as my invention and desire to secure by Letters Patent are—

1. I claim the hinged jaws, J, J, and screws e, e, e, e.

2. I claim the finished faces on the jaws j, j, of the fixed body of the stirrup—in combination with the hinged jaws, and for the purposes set forth as above.

JOHN H. MORE.

Witnesses:
  JOSEPH S. BECKER,
  WILLIAM METCALF.